United States Patent [19]

Thevenon

[11] Patent Number: 4,571,074

[45] Date of Patent: Feb. 18, 1986

[54] SPECTROMETRY DEVICE FOR ANALYZING POLYCHROMATIC LIGHT

[75] Inventor: Alain Thevenon, Bretigny, France

[73] Assignee: Instruments S.A., Paris, France

[21] Appl. No.: 452,480

[22] Filed: Dec. 23, 1982

[30] Foreign Application Priority Data

Jan. 4, 1982 [FR] France .................. 82 00018

[51] Int. Cl.$^4$ .............................. G01J 3/20
[52] U.S. Cl. ..................... 356/51; 250/339; 250/372; 356/328
[58] Field of Search .......... 356/51, 305, 326, 328, 356/333, 334; 250/339, 372

[56] References Cited

U.S. PATENT DOCUMENTS 4,250,465 2/1981 Leib .................. 372/21 X

OTHER PUBLICATIONS

Lagutin, *Bull. Crimean Astr. Phys.*, vol. 60, 1979, pp. 149–153.

*Primary Examiner*—F. L. Evans

*Attorney, Agent, or Firm*—Handal & Morofsky

[57] ABSTRACT

Spectrometry device capable of splitting up, for analysis, polychromatic light, thus yielding a spectrum which extends into the ultraviolet, visible and near infra-red ranges. The device makes it possible to analyze the polychromatic light coming from an excitation source and comprises a polychromator provided with a concave grating, which receives the said polychromatic light through an inlet slit in order to diffract it into monochromatic bundles of the ultraviolet region, directed onto outlet slits that are associated with measuring detectors, the slits and grating being positioned on the Rowland circle, wherein, essentially, the order O bundle, which is symmetrical to the incident bundle, relative to the perpendicular on the grating (23), is taken up by a second optical device which disperses the said bundle into monochromatic bundles of the visible or near infra-red regions, at least one outlet slit (8) selecting one monochromatic bundle, measured by a measuring detector (28). The device is particularly intended for a direct reading emission spectrometry instrument.

10 Claims, 2 Drawing Figures

SPECTROMETRY DEVICE FOR ANALYZING POLYCHROMATIC LIGHT

FIELD OF THE INVENTION

The present invention relates to a spectrometry device, capable of splitting up polychromatic light for analysis, giving a spectrum which reaches into the ultraviolet, the visible and the near infra-red ranges. This device is particularly intended for a direct reading emission spectrometry instrument.

BACKGROUND OF THE INVENTION

Polychromators are fitted into emission spectrometry instruments for analyzing the polychromatic light emitted by exciting the sample to be analyzed. These polychromators make use, most frequently, of the Paschen-Runge mounting arrangement and comprise a concave, engraved or holographic diffraction grating which receives the polychromatic light through an inlet slit in order to split it up, by diffraction, into a series of convergent bundles of monochromatic light. Some of these bundles are isolated or selected by outlet slits, placed at the level of the images of the inlet slit. In the Paschen-Runge mounting arrangement, the inlet slit, the grating and the outlet slits are situated on a notional circle, the so-called Rowland circle, which is tangential to the grating and has a diameter equal to the radius of curvature of the grating. The light fluxes are measured by detectors consisting of photomultipliers.

In emission spectrometry, the analysis lines are located mainly in the ultraviolet region. There is also a demand for analyzing the alkali metal elements, such as sodium, lithium, potassium, rubidium and cesium, the lines of which are located in the visible and near infra-red regions (from 5889 Å to 8521 Å).

For obtaining a spectrum extending from the ultraviolet to the near infra-red, a Paschen-Runge mounting arrangement having a great focal length (of the order of 1 meter) and a grating having 1000 to 1500 of lines per millimeter are generally used. As a result, the linear dispersion coefficient (number of nanometers per unit length of spectrum), which is inversely proportional to the number of lines per millimeter and to the focal length, is relatively high. The use of a single grating for such a wide wavelength range is therefore not advantageous.

SUMMARY OF THE INVENTION

The present invention relates to a spectrometry device of the dual polychromator type, having good linear dispersion, high resolution and very high efficiency in the ultraviolet, visible and near infra-red regions. The focal length (or the diameter of the Rowland circle) can have a low value, which reduces the space required and leads to very high stability towards thermal or mechanical fluctuations. Furthermore, this low space requirement makes it possible to reduce the weight and the price and to avoid temperature regulation. The device uses a plane field grating in the visible and near infra-red region.

The device according to the invention makes it possible to analyze polychromatic light coming from an excitation source and comprises a polychromator, provided with a concave grating, which receives the said polychromatic light through an inlet slit in order to diffract it into monochromatic bundles of the ultraviolet region, directed onto outlet slits, associated with measuring detectors, the said slits and the said grating being positioned on the Rowland circle, wherein, essentially, the order O bundle, symmetrical to the incident bundle, relative to the perpendicular on the grating, is taken up by a second optical device which disperses the said bundle into monochromatic bundles of the visible or near infra-red regions, at least one outlet slit selecting one said monochromatic bundle, measured by a measuring detector.

According to another aspect, the second optical device is a polychromator, the inlet slit of which is located at the image focus of the order O of the first grating.

According to one aspect, the number of lines per unit length of the grating of the first polychromator is greater than the number of lines per unit length of the grating of the second polychromator.

According to another aspect, the grating of the second polychromator is a plane field concave holographic grating.

According to one aspect, the parameters of the plane field holographic grating are adjusted so as to correct the astigmatism of the grating of the first polychromator.

According to one aspect, the order O bundle is reflected on at least one mirror between the first and the second grating.

According to another aspect, the device comprises a monochromator which analyzes the light from the excitation source, received by the first polychromator and the second optical device.

BRIEF DESCRIPTION OF THE DRAWINGS

The invention will now be described in greater detail, with reference to the embodiments given by way of example and shown in the attached drawings.

DETAILED DESCRIPTION

Figure 1:
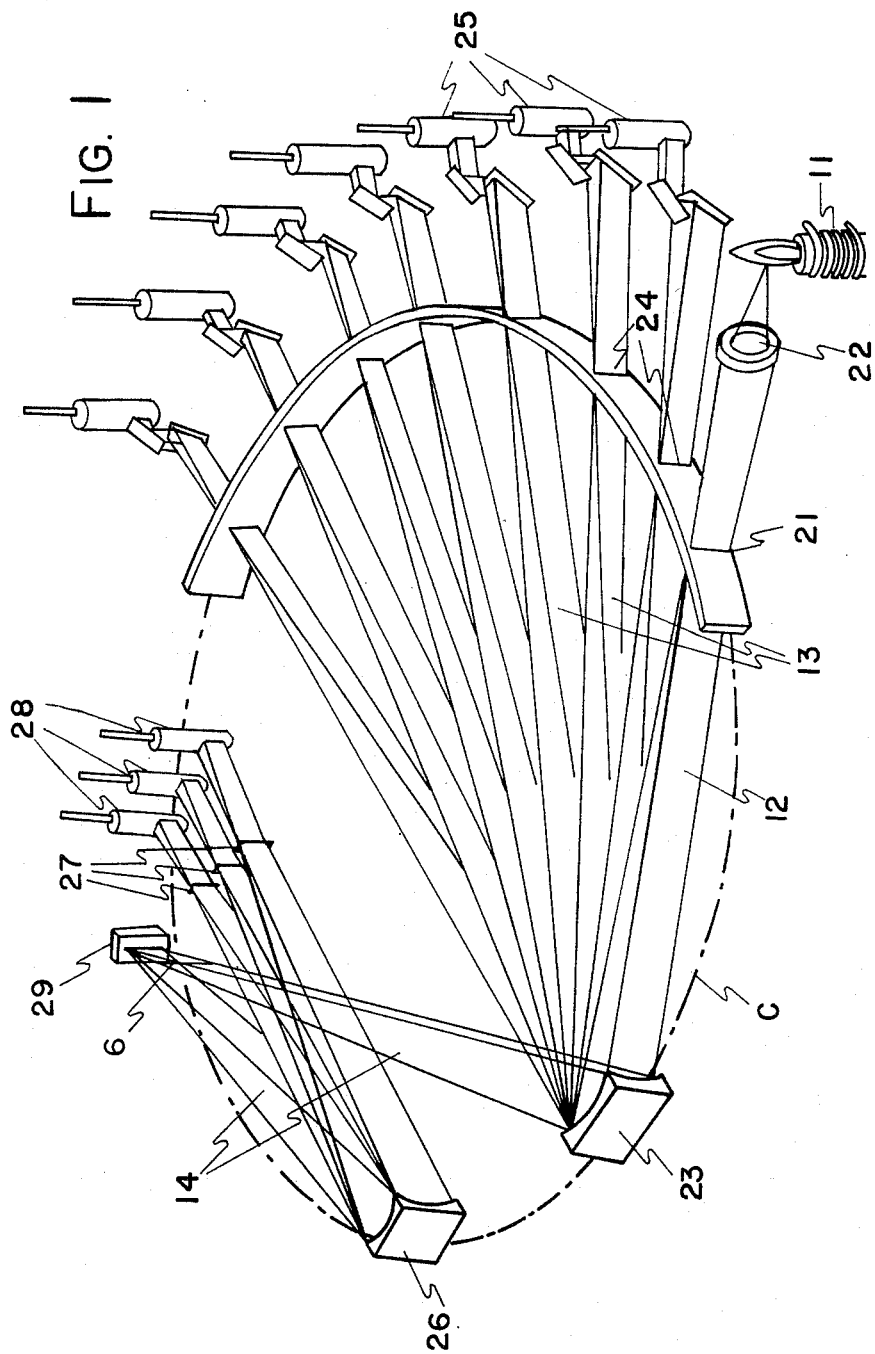
FIG. 1 is a diagrammatic view in perspective of a dual polychromator type device, according to the invention, for analyzing the light coming from an excitation source.

The dual polychromator type device, which is shown in FIG. 1, serves for analyzing the polychromatic light emitted by the sample under the influence of the excitation source 11. In the embodiment shown, the excitation source is a plasma source and the light coming from that source is focussed by an objective 22 onto an inlet slit 21.

This dual polychromator contains a first polychromator comprising the inlet slit 21, a grating 23, made up of a series of lines on a concave spherical surface, and outlet slits 24. Light flux measuring detectors of the photomultiplier type are associated with the outlet slits. The inlet slit 21, the concave grating 23 and the outlet slits 24 are positioned on a notional, so-called Rowland circle, marked C, which is tangential to the grating 23 and has a diameter equal to the radius of curvature of the grating.

The polychromatic bundle 12, coming from the inlet slit 21, is directed onto the grating 23. The light is diffracted by the grating 23 into a plurality of monochromatic bundles 13 which converge and yield images of the slit 21 on the Rowland circle, the outlet slits 24, mounted at the level of the images, selecting certain wavelengths.

Each monochromatic bundle 13 has an exact and well defined angular position. Supposing that the polychromatic light reaches the grating 23 at an angle of incidence α relative to the perpendicular N, the position of the diffracted light is given by the relationship: $\sin\alpha + \sin\beta = kn\lambda$, β being the angle of the bundle diffracted, relative to the perpendicular, n the number of lines per unit length of the grating, λ the wavelength and k a whole number. For any value of k, there is a spectrum corresponding to the different wavelengths, of which the incident polychromatic light is composed.

The measuring detectors 25 are mounted behind the outlet slits 24, relative to the direction of propagation of the light, for measuring the intensity of light passing through the said outlet slits.

The grating 23, which is made by engraving or holography, yields a spectrum in the ultraviolet range. It has a relatively large number of lines per unit length (of the order of 3600 lines/mm). In this way, the linear dispersion coefficient, which is inversely proportional to the number of lines per unit length and to the focal length, is relatively small and therefore linear dispersion is good. The focal length is short (of the order of 0.5 meter). Since the grating 23 has a large number of lines, the order O includes little ultraviolet light, some visible light and the whole of the near infra-red light. In the order O, there is no dispersion and the grating 23 reflects essentially the light of the visible and the near infra-red range like a mirror, the order O bundle being symmetrical to the incident bundle 12, relative to the perpendicular N of the grating. Furthermore, the grating 23 is optimised so as to improve the efficiency in the order 1 for the ultraviolet region.

The dual polychromator comprises a second optical device which splits up the order O bundle, marked 14, into a plurality of monochromatic bundles 15 of the visible near infra-red region, which are directed onto outlet slits 27, behind which light flux measuring detectors 28 are mounted, which are photomultipliers. The order O bundle is the bundle 14, which comes from the grating 23 of the first polychromator and which is symmetrical to the incident bundle 12 relative to the perpendicular N on the first grating 23. This second device is a polychromator provided with a grating 26, which is made up of lines surrounding a concave spherical surface. The notional or actual inlet slit 6 of this grating 26 is located at the image focus, marked 6, of the order O of the first grating 23, that is to say at the point situated on the Rowland circle, symmetrically to the inlet slit 21, relative to the perpendicular N on the grating 23.

Each outlet slit 27, associated with a monochromatic bundle, receives the image of the image 6 of essentially visible and infra-red light.

The second grating yields a spectrum in the visible and near infra-red region and has a smaller number of lines per unit length (of the order of 1200 lines/mm).

For example, the second rating 26 is a plane field, concave, spherical holographic grating in accordance with French Patent Specification No. 2,334,947 and its Addition No. 2,396,961.

The parameters of the grating 26 are adjusted so as to correct the astigmatism produced by the first grating 23 and thus to avoid energy losses. The grating corrections (aberration and astigmatism) are carried out in accordance with French Patent Specification No. 2,334,947 and its Addition.

The bundle in the order O can be reflected between the first grating 23 and the second grating 26 by a mirror 29. This arrangement leads to a reduction in space required.

The components associated with the second polychromator that is to say the grating 26, the mirror 29, the outlet slits 27, mounted on supports, and the measuring detectors 28, are mounted on a support that is fixed to the structure or frame carrying the components associated with the first grating 23.

Instead of being given by the grating 26, the spectrum, which extends into the visible and infra-red ranges, could be given by a dispersion or filtration element, which receives the order O bundle that comes from the first grating 23.

The dual polychromator type device described above can be used on its own for the simultaneous analysis of several elements. It can also be associated with a monochromator in an assembly illustrated in FIG. 2, so as to enable several elements to be analyzed simultaneously, amongst which there may be nonprogrammed elements or an element which has to be analyzed with high resolution (uranium, plutonium). This device thus makes it possible to carry out analyses in the ultraviolet, the visible and the near infra-red ranges, measurements in the ultraviolet range being effected with very high resolution.

Figure 2:
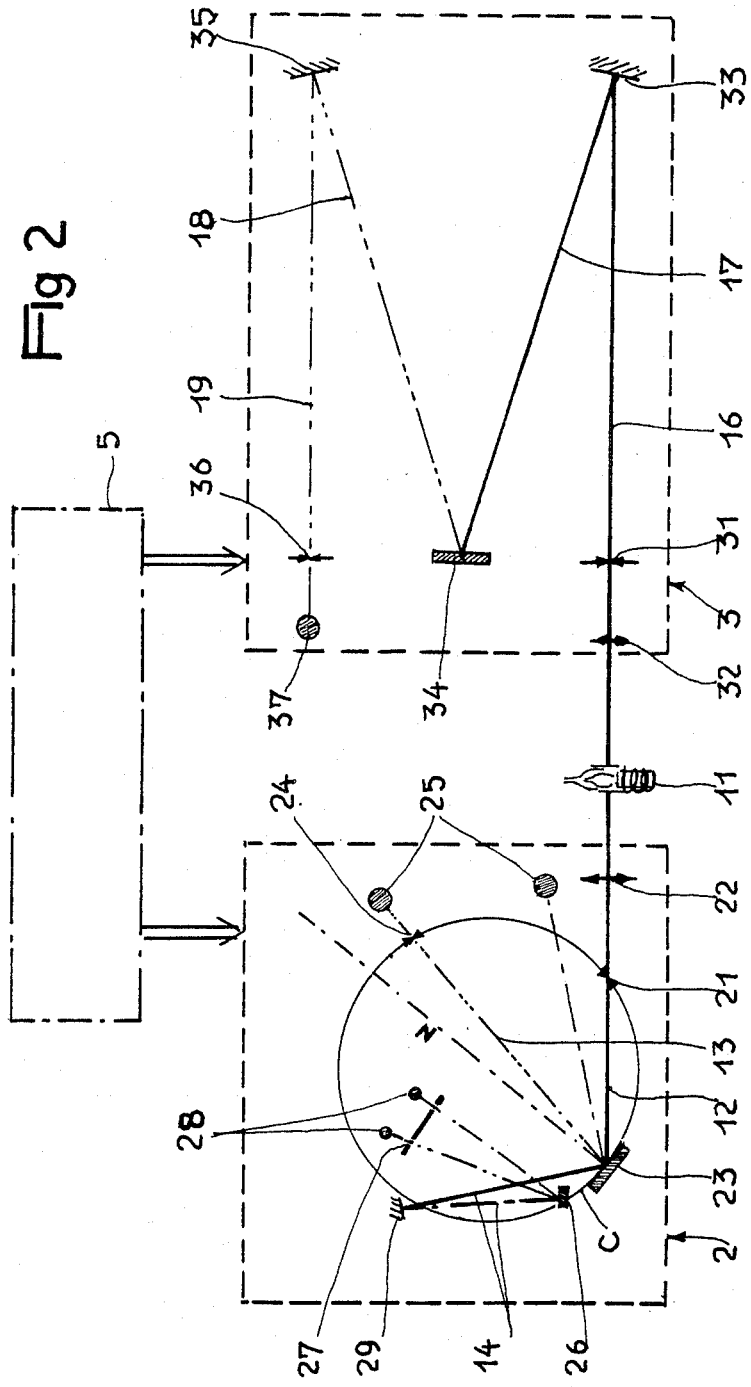
FIG. 2 shows a diagram of a device, in which a dual polychromator is associated with a monochromator.

The device illustrated in FIG. 2 associates, on the one hand, the dual polychromator type device, which is described above and which is marked 2, and, on the other hand, a monochromator 3. These two parts of the device analyze the light coming from a common excitation source 11.

The monochromator 3 uses a Czerny-Turner type mounting. It comprises a rectilinear inlet slit 31, onto which the light coming from the source 11 is focussed by an objective 32. The bundle 16, coming from the source 11, is reflected along 17 by a collimator mirror 33 of spherical concave type. The reflected bundle is received on a plane homographic grating 34 which diffracts the light, yielding a diffracted bundle 18. This bundle 18 is reflected along 19 by a focussing mirror 35 of spherical concave type. This reflected bundle 19 converges towards the outlet slit 36. The light flux is measured behind this outlet slit by a photomultiplier type detector 37. The grating 34, actuated by a motor, pivots about an axis parallel to the lines of the grating, the mirrors 33 and 35 being stationary.

The signals from the detectors 37, 25 and 28 are passed to an electronic control and processing unit 5, this unit guiding the assembly of the instrument equipped with the device.

I claim:

1. A spectrometry device for spectrographic separation and analysis of a first polychromatic light produced by an excitation source in the ultra-violet, visible and near infra-red region, comprising:
    (I) a first spectrographic section, comprising:
        (a) first inlet slit means for receiving said first polychromatic light from said excitation source;
        (b) coupling means for coupling light from said polychromatic excitation source onto said first inlet slit means;
        (c) first grating means for receiving said polychromatic light passing through said first inlet slit means and diffracting light incident on said first grating means into at least one monochromatic bundle in the ultra-violet range and a second O order polychromatic bundle in the visible and near infra-red range, said O order bundle being symmetrical to the incident bundle about a perpendicular to said first grating, and said O order bundle being imaged at a O order focal point;
(d) first outlet slit means positioned for receiving said ultra-violet range monochromatic bundles diffracted from said first grating means; and
(e) first measuring detector means mounted behind the first outlet slit means for measuring the intensity of the ultra-violet range light passing through said first outlet slit means; and (II) a second spectrographic section for analyzing said O order bundle of light from said first grating means, said second spectrographic section, comprising:
(f) second inlet slit means located at sid O order focal point;
(g) second grating means for receiving said O order bundle passing through said second inlet slit means and diffracting it into at least one monochromatic bundle in the visible/near infra-red region;
(h) second outlet slit means positioned for receiving visible and infra-red light bundles diffracted from said second grating means; and
(i) second measuring detector means mounted behind said second outlet slit means for measuring the intensity of said monochromatic bundles in the visible and near infra-red range.

2. A spectrometry device as in claim 1, wherein said coupling means comprises an objective.

3. A spectrometry device as in claim 2, wherein said first grating means has a line density which causes it to reflect said O order bundle in the same manner as a mirror.

4. A spectrometry device as in claim 3, wherein said first grating means comprises a concave focusing grating, said first inlet slit means, said first outlet slit means, and said first grating means being located on the Rowland circle defined by said first grating means.

5. A spectrometry device according to claim 4, wherein said O order bundle is folded by being reflected between said first grating means and said second grating means by a mirror.

6. A spectrometry device according to claim 4, wherein the number of lines per unit length on said first grating means is greater than the number of lines per unit length on said second grating means.

7. A spectrometry device according to claim 4, wherein the second grating is a concave holographic grating configued, positioned, and dimensioned to form a planar field.

8. A spectrometry device according to claim 7, wherein the parameters of the planar field holographic grating are selected so as to correct the astigmatism of the first grating means.

9. A spectrometry device according to claim 4, wherein the optical path defined by said O order bundle is folded by being reflected by at least one mirror disposed between said first grating means and said second grating means.

10. A spectrometry device as in claim 1 further comprising a monochromator for analyzing light coming from said excitation source, said light being analyzed by said monochromator representing a portion of the light emitted by said excitation source but not sent to said first or second spectrographic sections.

* * * * *